US010936002B1

(12) United States Patent
Miller et al.

(10) Patent No.: US 10,936,002 B1
(45) Date of Patent: Mar. 2, 2021

(54) RUGGEDIZED TRIGGERING HANDLE FOR MOBILE SCANNING SYSTEM

(71) Applicant: MobileDemand LC, Hiawatha, IA (US)

(72) Inventors: Matthew Miller, Cedar Rapids, IA (US); Steven R. Kunert, Cedar Rapids, IA (US); Adam Bumpus, Cedar Rapids, IA (US)

(73) Assignee: MOBILEDEMAND LC, Hiawatha, IA (US)

( * ) Notice: Subject to any disclaimer, the term of this patent is extended or adjusted under 35 U.S.C. 154(b) by 465 days.

(21) Appl. No.: 15/833,815

(22) Filed: Dec. 6, 2017

Related U.S. Application Data

(60) Provisional application No. 62/430,710, filed on Dec. 6, 2016.

(51) Int. Cl.
*G06K 7/10* (2006.01)
*G05G 9/047* (2006.01)
*G06K 7/00* (2006.01)
*G05G 1/02* (2006.01)
*G07G 1/00* (2006.01)

(52) U.S. Cl.
CPC .............. *G05G 9/047* (2013.01); *G05G 1/02* (2013.01); *G06K 7/0004* (2013.01); *G06K 7/1098* (2013.01); *G06K 7/10881* (2013.01); *G07G 1/0081* (2013.01); *G05G 2009/04703* (2013.01)

(58) Field of Classification Search
CPC .......... G06K 7/10881; G06K 7/10386; G06K 17/0025; G06Q 20/32
USPC ............. 235/472.02, 462.45, 462.46, 472.01
See application file for complete search history.

(56) References Cited

U.S. PATENT DOCUMENTS

| 4,845,699 | A | * | 7/1989 | Kawasaki | ............ G11B 7/0932 369/44.22 |
| 5,514,861 | A | * | 5/1996 | Swartz | ................... G06F 1/163 235/462.44 |
| 8,856,033 | B2 | | 10/2014 | Hicks et al. | |
| 9,558,482 | B2 | | 1/2017 | Hicks et al. | |
| 2003/0059051 | A1 | * | 3/2003 | Hatano | ............... H04L 63/0428 380/270 |
| 2007/0030128 | A1 | | 2/2007 | Hills et al. | |
| 2011/0080414 | A1 | * | 4/2011 | Wang | ................. G06K 7/10722 345/502 |
| 2012/0315845 | A1 | * | 12/2012 | Buczek | ............... H04M 1/7253 455/41.1 |

(Continued)

*Primary Examiner* — Daniel St Cyr
(74) *Attorney, Agent, or Firm* — Suiter Swantz pc llo

(57) ABSTRACT

A ruggedized triggering handle device for a mobile scanning system supports a mobile device (tablet, smartphone) attachable by a bracket on the upper surface of the handle. The handle may establish a wireless link to the mobile device; a trigger of the handle device includes a magnetic switch which, when driven proximate to a triggering element enclosed within the handle, causes the triggering element to transmit key codes and instructions via the wireless link, enabling the user to trigger applications and peripheral components (e.g., cameras, scanners, imagers) of or proximate to the mobile device via the handle. The handle may be contoured to the user's hand such that the trigger corresponds to the index finger; additional buttons corresponding to other fingers may allow for remote operation of other applications, functions, and peripherals of the mobile device by other fingers without the need for visual reference to the handle.

19 Claims, 13 Drawing Sheets

(56) References Cited

U.S. PATENT DOCUMENTS

2017/0140363 A1     5/2017   Hicks et al.
2019/0014890 A1*    1/2019   Li ........................ A45C 11/00
2019/0392184 A1*   12/2019   Codato ............. G06K 7/10881

* cited by examiner

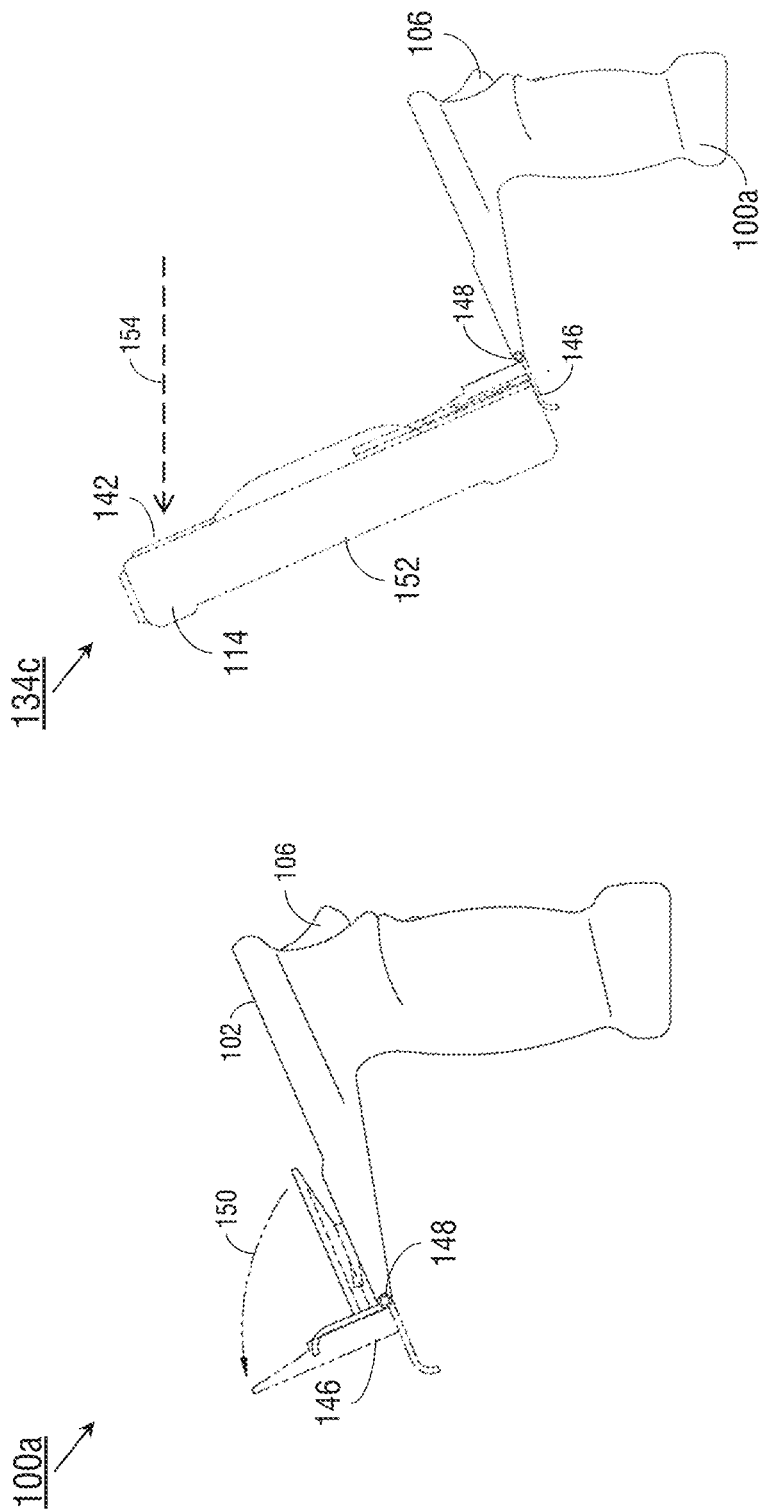

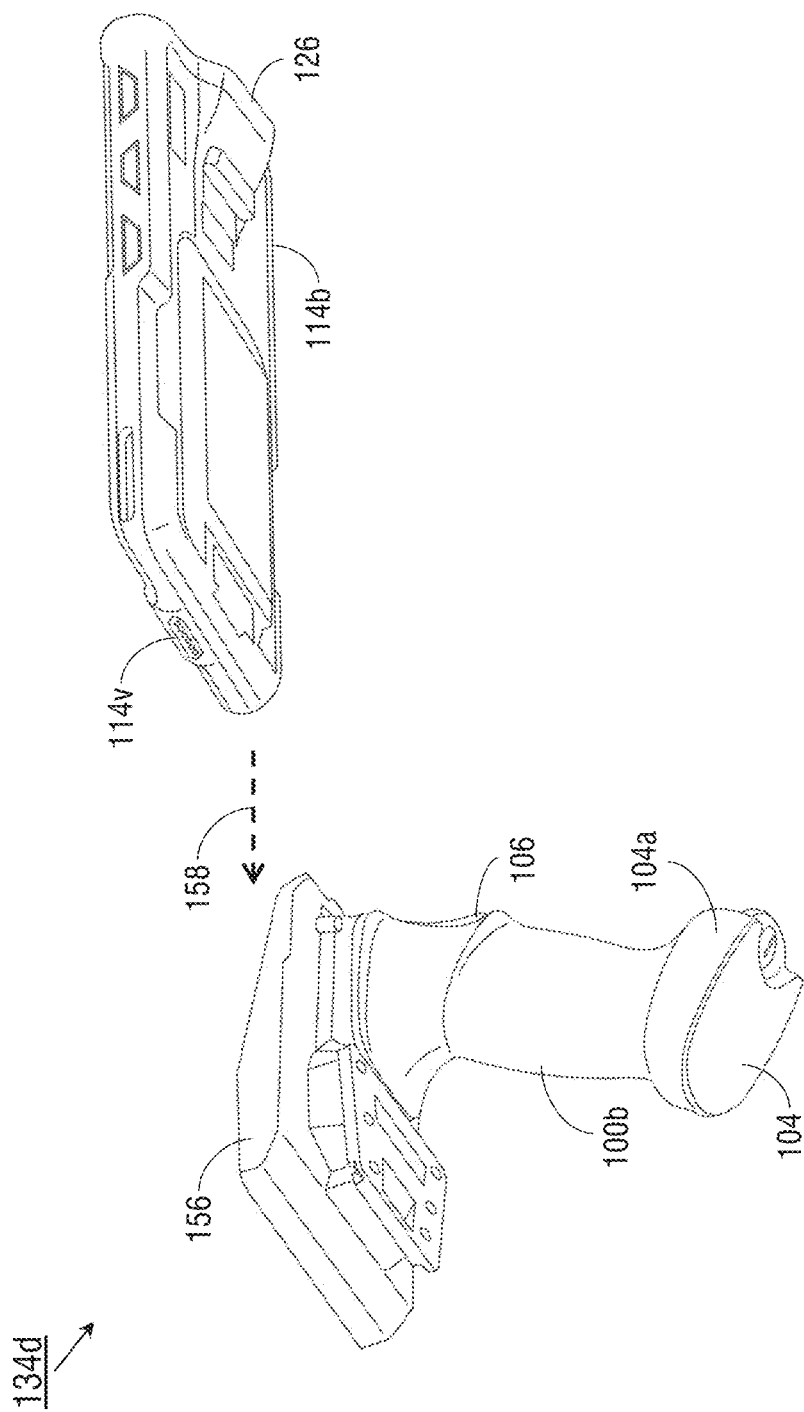

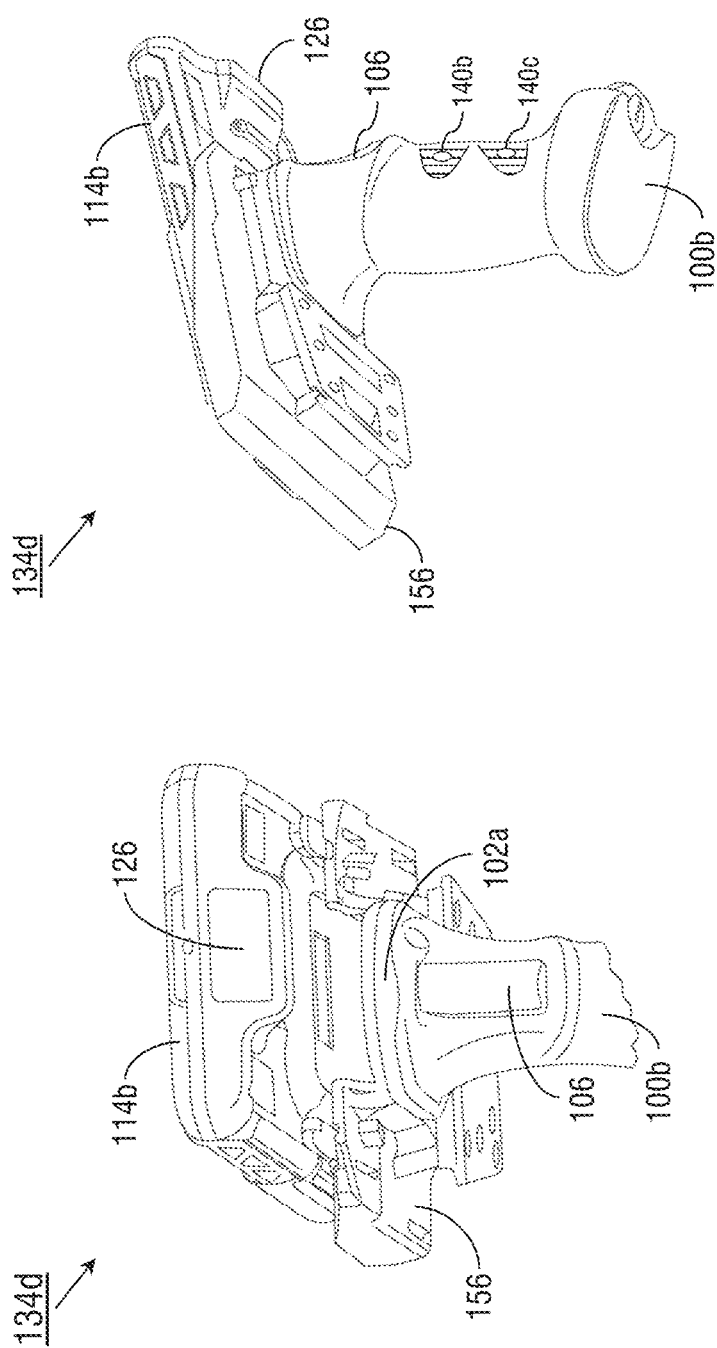

RUGGEDIZED TRIGGERING HANDLE FOR MOBILE SCANNING SYSTEM

CROSS-REFERENCE TO RELATED APPLICATIONS

The instant application claims priority under 35 U.S.C. § 119(e) to provisional U.S. Patent Application Ser. No. 62/430,710, filed on Dec. 6, 2016. Said U.S. Patent Application 62/430,710 is herein incorporated by reference in its entirety.

BACKGROUND

Tablets, portable computing devices, multifunction smartphones, and other such mobile devices with peripheral components embedded in their edges or faces (e.g., scanners, cameras, imagers) may not be ideally configured for one-handed use of these peripherals, especially if the mobile device is partially or fully housed in a protective casing. Such a protective casing shields the mobile device from extreme temperatures and pressures, moisture, or impacts that might otherwise cause damage or hinder the operation of the device. Further, the mobile device may include a strap or handle to allow a user to support the mobile device with one hand while operating its touchscreen with the other hand. However, protective casings may add dimension and weight to the mobile device, and may interfere with the straps or handles (if, for example, the handles require a physical connection to a port of the mobile device). The handles may still require the user to support the mobile device with one hand and operate applications and peripherals (e.g., via a touchscreen of the mobile device) with the other hand. Finally, some mobile devices may not incorporate built-in peripherals, requiring the attachment of discrete scanning or imaging modules to the mobile device, or to the protective casing, to achieve the desired functionality; establishing a physical datalink between the module and the mobile device may add still more bulk or complexity

SUMMARY

In a first aspect, embodiments of the inventive concepts disclosed herein are directed to a ruggedized triggering handle device for a mobile scanning system. The handle device has an outer shell or housing contoured to a user's hand and fashioned of a high impact material. The outer shell has an upper portion terminating in a top surface and a lower portion terminating in a bottom surface, and encloses an inner shell fashioned of the same high impact material. The top surface may at least partially support a mobile computing, communications, or scanning device attachable to the handle device by an attachment bracket (e.g., grooves or slots) couplable to a corresponding attachment plate of the mobile device. The handle device includes a memory enclosed within the outer shell for storing encoded instruction sets or key codes associated with particular applications or peripheral devices (e.g., cameras, scanners, imagers) of the mobile device. The handle device includes a triggering element enclosed by the inner shell. The triggering element may establish a wireless link between the handle device and mobile device, and transmit particular stored key codes or instruction sets to the mobile device, activating the associated applications or peripherals, when the handle device is in an active state. The handle device includes a trigger corresponding to the user's index finger; actuation of the trigger thereby drives a magnetic switch or element proximate to the triggering element, initiating the active state. The handle device includes one or more light emitting diodes (LED) or similar luminous elements for indicating the active state or the status of the wireless link. The handle device may further link to, and activate, a discrete peripheral module proximate to the handle, where the peripheral module is physically attached but not operably connected to the mobile device.

In a further aspect, embodiments of the inventive concepts disclosed herein are directed to an enumerating device used for activating applications or peripherals of a mobile device wirelessly linked, but not physically attached, to the mobile device without visual reference to the enumerating device. The enumerating device has an outer housing or shell fashioned of enterprise-grade high impact plastic and contoured to the user's left or right hand. The enumerating device includes a triggering element within the outer shell, for establishing a wireless link to the mobile device. The enumerating device includes a memory for storing encoded instruction sets or key codes for activating the applications or peripherals of the mobile device. The enumerating device includes buttons set into the outer shell and contoured to the user's thumb and fingers; the buttons may be recessed to allow for easier actuation of the right buttons (triggering particular applications or peripherals associated with the particular button and finger) without visual reference and prevent inadvertent actuation of the wrong buttons. The recesses may further support the corresponding fingers in non-actuating positions when the buttons are not in use.

BRIEF DESCRIPTION OF THE FIGURES

FIG. 5A is a right-side view of a triggering handle according to the inventive concepts disclosed herein; and FIG. 5B is a right-side view of a system including the mobile device of FIG. 2A and the triggering handle of FIG. 5A;

FIG. 6A is a right-side view of an exemplary embodiment of a system including a triggering handle and a mobile device according to the inventive concepts disclosed herein;

FIGS. 6B and 6C are respectively front and right-side views of the system of FIG. 6A;

DETAILED DESCRIPTION OF EXEMPLARY EMBODIMENTS

Figure 1:
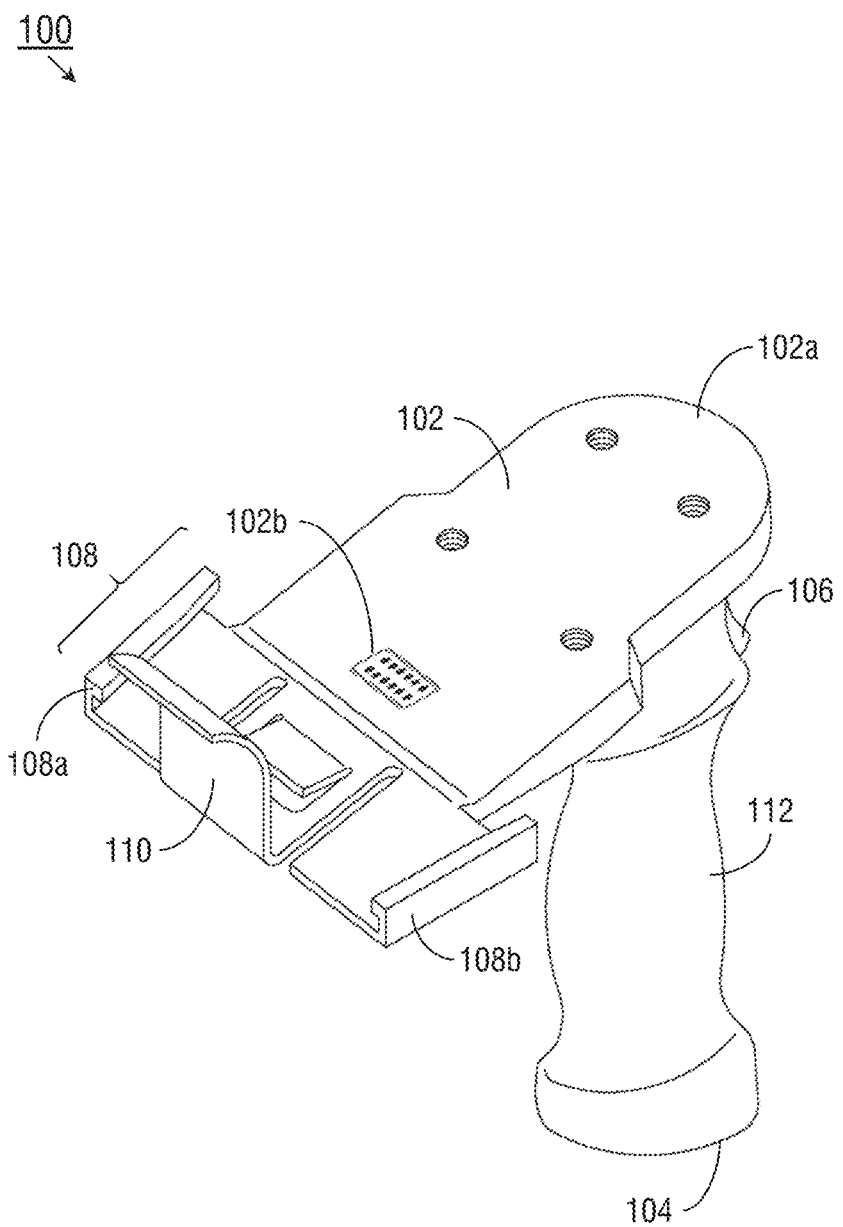
FIG. 1 is an overhead perspective view of a triggering handle according to embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a ruggedized triggering handle physically attachable, and wirelessly connectable, to a mobile device which may be housed in a protective casing. The triggering handle may allow a user to securely support the mobile device in one hand (whether the user is right- or left-handed) while "aiming" the device in such a way that one or more peripherals or applications may be activated with the same supporting hand, via the triggering handle. The triggering handle may be configured or programmed to activate specific applications or peripherals via specific actuations (or actuation sequences) of the trigger or of other buttons dedicated to specific fingers of the supporting hand. In this way, the triggering handle may link to a mobile device and execute multiple, repetitive, or varied applications of the mobile device via the single supporting hand and without the need for visual reference to the handle.

Referring to FIG. 1, a triggering handle 100 according to embodiments of the inventive concepts disclosed herein may include an upper portion terminating in a top surface 102, a lower portion terminating in a bottom surface 104, a trigger 106, an attachment bracket 108, and a release tab 110.

The triggering handle 100 may be formed of enterprise-grade rigid high-impact plastic or any similar durable, lightweight material. The exterior of the triggering handle 100 may include an outer shell (112) and an inner shell enclosed within the outer shell (the outer shell being at least partially hollow so as to enclose components of the triggering handle), such that a triggering element may be situated within a sealed weather-resistant internal area defined by the inner shell, which may be fashioned of the same material as the outer shell. In some embodiments, the triggering handle 100 may be rated at least IP65 (dust-tight and resistant to water jets). The attachment bracket 108 may be configured to be removably attached to the rear face of a suitably equipped mobile device (e.g., a mobile communications or computing device such as a smartphone, tablet, or phablet). For example, the attachment bracket 108 may include one or more grooves 108a, 108b configured to slidably interact with matching tabs on the rear face of the mobile device (or a corresponding attachment component incorporated into, or attached to, the mobile device). In this way, the triggering handle 100 may be intuitively attached to the mobile device such that the mobile device may be "pointed" or "aimed" at a desired target by a user grasping the mobile device via the triggering handle 100. The triggering handle 100 may be detached from a mobile device via the release tab 110. In some embodiments, the top surface 102 may include surface contacts 102b (e.g., pogo pins, spring pins) configured to directly interface with a suitably equipped tablet, smartphone, or other like mobile device (rather than linking wirelessly to the mobile device, e.g., via Bluetooth or a similar wireless protocol).

Figure 2A:
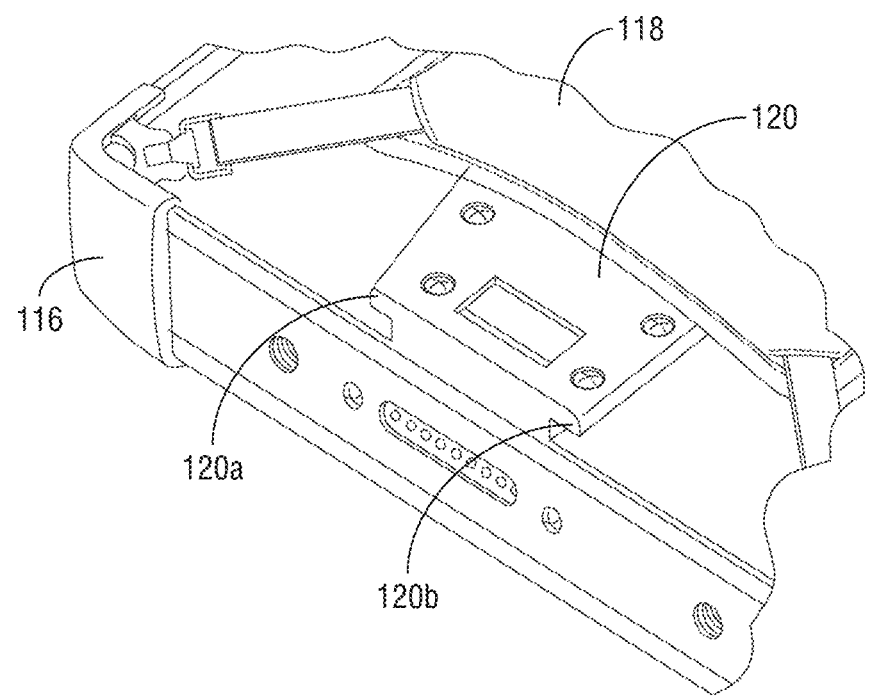
FIGS. 2A and 2B illustrate the attachment of the triggering handle of FIG. 1 to a mobile device according to the inventive concepts disclosed herein.
Figure 2B:
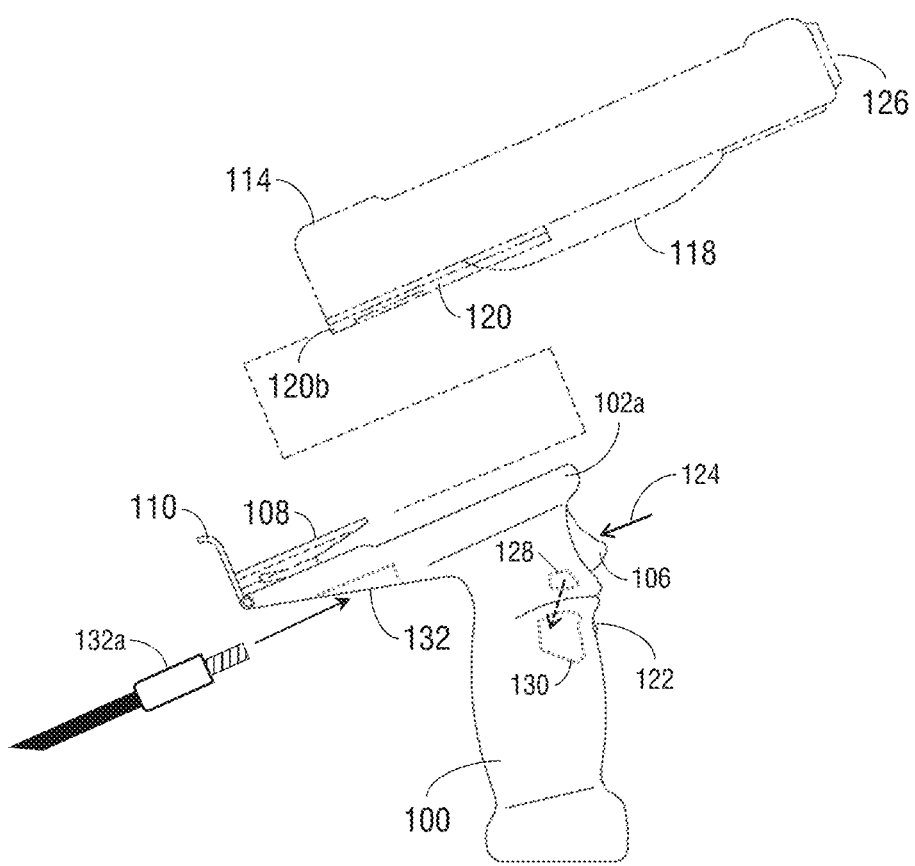

Referring also to FIGS. 2A and 2B, a mobile device 114 may be encased in a protective casing including reinforced corners (116) and/or a carrying strap (118), which the attachment of the mobile device 114 to the triggering handle 100 may accommodate. The top surface 102 of the triggering handle 100 may be configured to accommodate the carrying strap 118 such that the carrying strap need not be removed or detached from the mobile device 114 in order to physically attach the triggering handle 100. For example, the dorsal face of the mobile device 114 (e.g., the face opposite the display surface of the mobile device and proximate to the top surface 102 of the triggering handle 100) may include an attachment plate 120. The attachment plate 120 may include left and right tabs 120a, 120b compatible with the grooves (108a, 108b, FIG. 1) of the attachment bracket 108 of the triggering handle 100.

The top surface 102 may partially support the mobile device 114 in place once the mobile device is physically attached to the triggering handle 100. The bottom surface 104 may be configured to support the triggering handle 100 in a stable level state on a flat surface whether or not the triggering handle is physically connected to the mobile device 114.

Referring in particular to FIG. 2B, the mobile device 114 may slidably attach to the triggering handle 100, the tabs (120b) of the attachment plate 120 sliding into the grooves (108b) of the attachment bracket 108 until the mobile device 114 is secured in place by the release tab 110. The triggering handle 100 may include one or more luminous elements, such as an LED 122 or similar indicator, configured to indicate a current state of the handle. For example, when the triggering handle 100 is attached to a mobile device 114, the triggering handle 100 may attempt to establish a wireless link to the mobile device 114 (e.g., via Bluetooth or any appropriate similar wireless protocol). The LED 122 may blink on and off during this process, changing to a solid "on" state once a connection has been established. For example, once the triggering handle 100 is attached and linked to the mobile device 114, a user may actuate or activate (124) the trigger 106 in order to "wake up" a mobile device 114 currently set to a "sleep" mode.

One or more desired peripheral components (126) of the mobile device 114, such as a barcode scanner or imager (e.g., 2D cameras, 3D/infrared (IR) imagers and imaging systems), may align with the triggering handle 100, such that the desired peripheral 126 is positioned directly above the front (102a) of the top surface 102. Any object at which the user points while grasping the triggering handle 100 may thus be scanned, or its image captured, by the desired peripheral 126, the target object being within the field of vision (FOV) of the peripheral. The desired peripheral 126 (or, e.g., a software application configured to execute on processors of the mobile device 114) may be activated by pressing the trigger 106, e.g., with the user's index finger.

For example, an actuation (124) of the trigger 106 may articulate a small magnetic element 128 (e.g., magnetic switch) embedded in the end of the trigger. The magnetic element 128 or magnetic switch may include, for example, a solid-state switch or magnet capable of detection by a Hall effect or similar magnetic-field sensor within, or proximate to, a triggering element 130. The triggering element 130 (e.g., wireless transmitter/receiver) may be sealed within the inner shell of the triggering handle 100 to protect the triggering element from damage due to moisture, wind, or shock. The triggering element 130 may be positioned just outside a predetermined proximate range from to the end of the trigger 106 containing the magnetic element 128. If the magnetic element 128 is brought proximate to the triggering element 130 by actuation (124) of the trigger, an active trigger state (e.g., active state of the triggering handle) may commence. In the event of an active trigger state, one or more key codes (e.g., encoded instructions or instruction sets) may be wirelessly transmitted from the triggering handle 100 to the linked mobile device 114. The mobile device 114 may include software configured to initiate specific actions of the mobile device 114, or of its peripheral components 126, upon the receipt of a particular key code. For example, key codes may be programmed to activate the peripheral devices 126 or components of the mobile device 114, e.g., a barcode scanner, a camera, or a 3D imager. A transmitted key code, or combination of key codes, may additionally activate software installed on the mobile device 114 and configured to operate in conjunction with the activated peripherals 126, such as a volume dimensioning system of the mobile device 114 configured to receive and process input received from a 3D imager. For example, a 3D imager may be activated to capture imagery associated with a package or parcel; the volume dimensioning system may assess the dimensions of the parcel. A barcode scanner may determine shipping or handling information of the parcel based on detecting and decoding data encoded on the exterior of the parcel, such as a barcode or QR code. The triggering handle 100 may include additional internal circuitry such as a USB port 132 (or any appropriate similar communications port) capable of receiving a USB cable 132a (or like cable compatible with the connection port) and thereby charging internal batteries of the triggering handle.

Figure 3A:
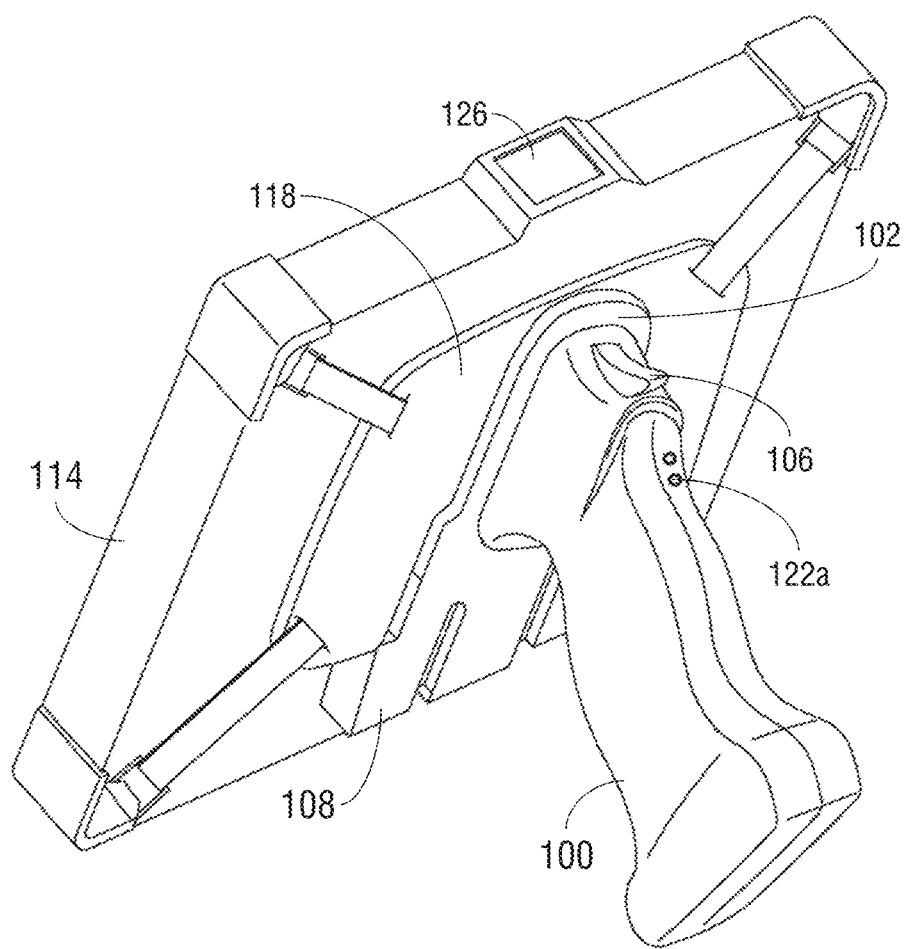
FIG. 3A is a right-side low-angle view of a system including the triggering handle of FIG. 1 and the mobile device of FIG. 2A.
Figure 3B:
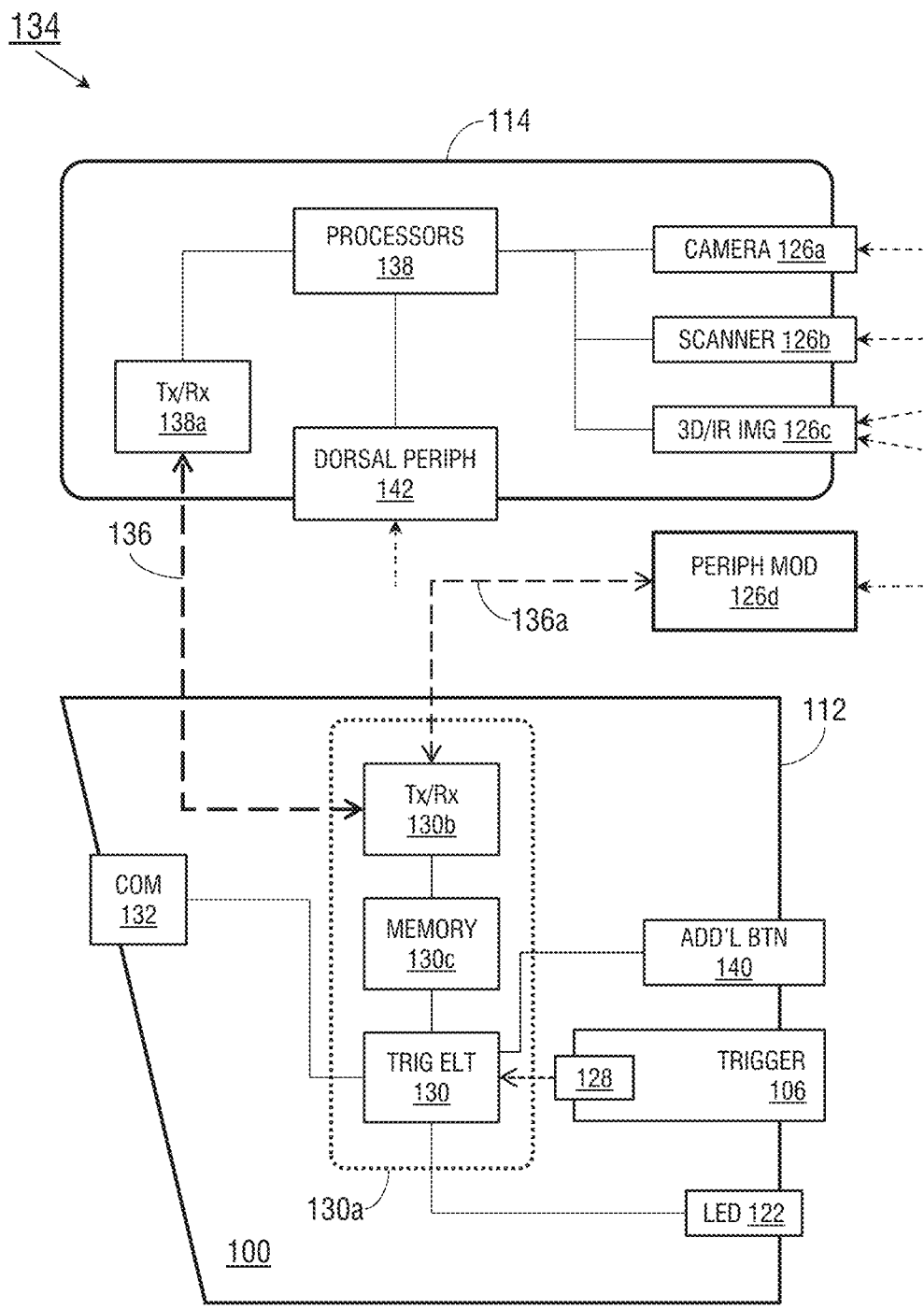
FIG. 3B is a diagrammatic illustration of the system of FIG. 3A.

Referring to FIGS. 3A and 3B, a system 134 according to embodiments of the inventive concepts disclosed herein may include the triggering handle 100 of FIG. 1 physically attached to, and wirelessly linked to, the mobile device 114 of FIGS. 2A-B.

In some embodiments, the triggering handle 100 may include an additional luminous element or LED (122a) for indicating an active trigger state (e.g., the light is "on" when the trigger 106 is pressed), an attempt to wirelessly link the triggering handle 100 to the mobile device 114, or a successfully established wireless link (136) between the triggering handle and mobile device. An active trigger state may cause the triggering element 130 (enclosed within the inner shell, 130a) to transmit (130b) to the mobile device 114 key codes or instructions for executing a predetermined keyboard sequence associated with the activation of a particular component or peripheral (126) or application associated with the peripheral 126 (e.g., activating a 2D camera 126a or barcode scanner 126b, or commencing a volume dimensioning process by activating a 3D imager 126c). The mobile device 114 may communicate the successful triggering of the desired peripheral 126a-c or application via audio prompts or a tone specific to the triggered peripheral or application.

Key codes and instructions transmitted by the triggering handle 100 to the mobile device 114 may be stored to a memory 130c of (or proximate to) the triggering element 130. For example, the memory 130c may include Flash memory, solid-state memory, electrically erasable programmable read-only memory (EEPROM), or any appropriate similar memory capable of storing and erasing the encoded key codes and instructions. The key codes and instructions may be assembled or determined by a user of the system 134 via the mobile device 114 (which may include onboard processors 138) and sent (138a) to the triggering handle 100 via wireless link (136), thereby "initializing" or "configuring" the triggering handle 100 for control of the mobile device or its peripherals 126a-c. For example, in response to an actuation of the trigger 106 (or a combination of a trigger actuation with actuations of additional buttons (140)), events associated with the mobile device 114 may include: activation of a camera 132a, barcode scanner 132b, or 3D/IR imager 132c; interfacing with another peripheral, such as a dorsally incorporated peripheral (142) mounted to the dorsal face (e.g., underside, face opposite the display screen) of the mobile device 114; launching or deactivating additional software applications; and incrementing a counter (e.g., trackable and displayable by the mobile device). Software executing on the mobile device 114 may include a configuration interface providing for the unique mapping of specific actuations (124) or sequences of actuations of the trigger 106 and additional buttons 140 to the desired applications or peripherals 126a-c activated in response.

The processors 138 of the mobile device 114 may include software configured to execute on the mobile device 114 based on key codes and instructions received from the triggering handle 100 (e.g., user applications or system services/processes). For example, the software may monitor the wireless link 136, processing events as the key codes are received from the triggering handle 100. The key codes may include, e.g., key press/release events processed as hotkey events by the mobile device 114. Similarly, the triggering handle 100 may function as a serial-connected device via the COM port (132) for serial emulation via USB or Bluetooth. Alternatively, the triggering handle 100 may function as a USB-connected Human Interface Device (USB-HID), sending HID event codes over a physical USB link via the COM port 132; the mobile device 114 may process events specific to the particular HID device type.

The triggering handle 100 may alternatively or additionally wirelessly link to (136a), and operate in conjunction with, a remote peripheral module 126d. For example, the remote peripheral module 126d may be mechanically or physically attached to the mobile device 114 or its protective housing (e.g., via screws, bolts, or other removable or permanent fasteners), but not operatively or logically connected to the mobile device in any way.

Figure 4A:
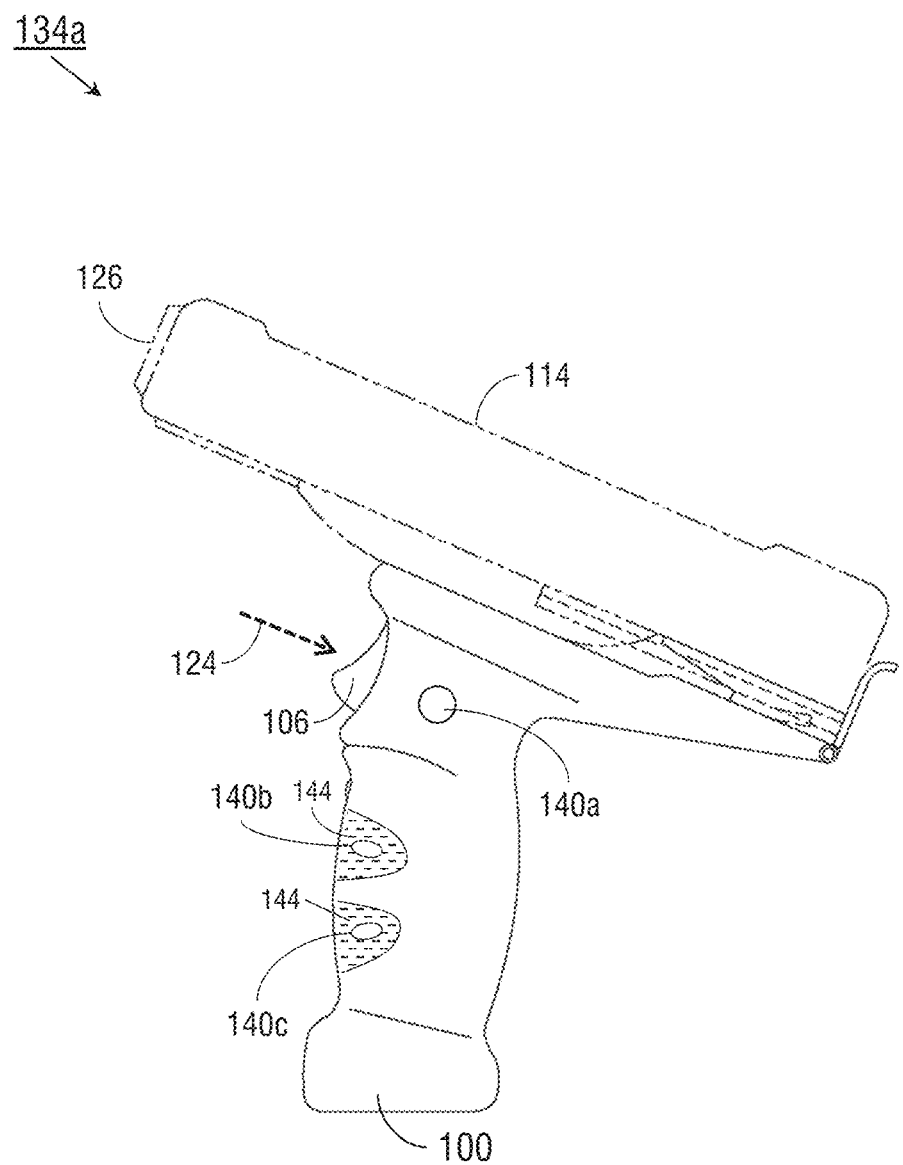
FIG. 4A is a left-side view of the system of FIG. 3A.

Referring to FIG. 4A, the system 134a may be implemented and may function similarly to the system 134 of FIG. 3A, except that the triggering handle 100 of the system 134a may be contoured and configured for left-hand or right-hand use, or for ambidextrous use by either hand. For example, the triggering handle 100 may be contoured or augmented with additional padding or cushioning material (not shown) to fit either the left or right hand and configured such that the trigger 106 may be actuated (124) with the index finger of the hand (left or right) currently grasping the triggering handle. Additional buttons (140, FIG. 3B) of triggering handle 100 may include a thumb button 140a configured for actuation by the thumb of the hand holding the triggering handle 100 and recessed buttons 140b-c configured for actuation by non-index fingers of the hand (the index finger reserved for actuation of the trigger 106).

For example, the thumb button 140a which may be programmed to activate additional peripherals or applications of the mobile device 114 when activated (e.g., apart from those configured for activation in response to an actuation 124 of the trigger 106). As shown by FIG. 4A, the thumb button 140a may be positioned on the upper left side of the triggering handle 100 to facilitate rapid actuation of the thumb button with the right thumb (e.g., without the need to visually locate the thumb button). For example, if the trigger 106 activates a peripheral 126 of the mobile device 114 (e.g., barcode scanner (126b, FIG. 3B)), the thumb button 140a may cause the mobile device to transmit the scanned information, e.g., to one or more preprogrammed remote users. In some embodiments, the thumb button 140a may function as a "reset button" for refreshing a wireless link (136, FIG. 3B) to the mobile device 114, e.g., if said mobile device is in a "sleep" or hibernation mode.

Similarly, the recessed buttons 140b-c may be positioned and programmed/configured to activate additional peripherals or applications of the mobile device 114 in response to actuation by other fingers of the hand holding the triggering handle 100. For example, as shown by FIG. 4A, the recessed buttons 140b-c may be positioned for rapid actuation by the middle and ring fingers of the right hand respectively. Similarly, the key codes or encoded instructions stored to the memory (130c, FIG. 3B) may include specific codes or instructions dedicated to the thumb button 140a and recessed buttons 140b-c. The recessed buttons 140b-c (as well as the thumb button 140a) may be surrounded by dedicated recesses (144) set into the outer shell (112, FIG. 1). For example, the recesses 144 may be textured so that the user may quickly match the appropriate fingers to their corresponding recessed buttons 140b-c without looking at the triggering handle 100. Similarly, the recesses 44 may be sized and shaped to allow the corresponding fingers to rest in or on the recesses, quickly actuating the appropriate recessed buttons 140b-c when desired without inadvertently actuating the wrong recessed buttons.

Figure 4B:
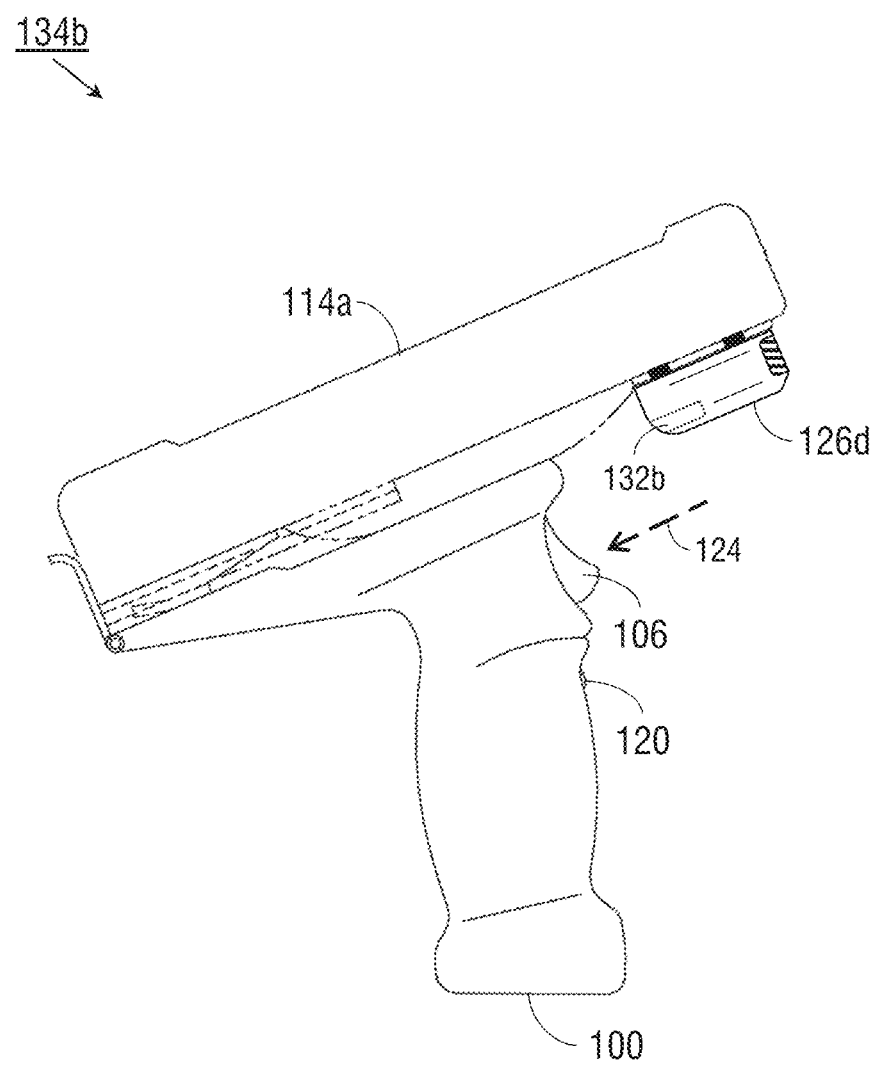
FIG. 4B is a right-side view of the system of FIG. 4A.

Referring to FIG. 4B, the system 134b may be implemented and may function similarly to the system 134a of FIG. 4A, except that the system 134b may include a remote peripheral module 126d mechanically or physically attached to a mobile device 114a or to its protective case/housing (e.g., bolted, screwed, fastened) and aligned with the triggering handle 100, e.g., oriented so as to be "amiable" by grasping the triggering handle and pointing the system 134b in the appropriate direction.

However, the remote peripheral module 126d may not be logically or operatively connected to, or controlled by, the mobile device (e.g., via physical data link). For example, the remote peripheral module 126d may include (but is not limited to) a barcode scanner, fingerprint scanner, 2D/visible-light camera, or 3D/IR imager, independently powered by a self-contained battery or power source (e.g., a capacitive power source able to rapidly recharge via USB port (132b)). The remote peripheral module 126d may not be electronically linked to the mobile device 114a yet sufficiently proximate to the triggering handle 100 that the remote peripheral module may be configurable (e.g., via a triggering handle software interface application executing on the mobile device 114a, or via Bluetooth Low Energy (BLE) or any appropriate similar short-range wireless protocol) for remote activation (e.g., via by actuation (124) of the trigger 106) by key codes or instructions transmitted by the triggering handle.

Referring to FIGS. 5A and 5B, the triggering handle 100a may be implemented and may function similarly to the triggering handle 100 of FIG. 1, except that the triggering handle 100a may include a hinged attachment bracket 146. The hinged attachment bracket 146 may be implemented and may function similarly to the attachment bracket 108 of FIG. 1, except that the hinged attachment bracket 146 may include a hinge 148 configured to pivot or rotate the hinged attachment bracket "upward" (150; e.g., toward the user, orthogonal to a line of sight of a forward-oriented peripheral (126b, FIG. 4A) aligned with the top surface 102 and trigger 106 of the triggering handle 100a)) through a continuous arc of substantially 90 degrees.

Referring in particular to FIG. 5B, the system 134c may be implemented and may operate similarly to the systems 134a-b of FIGS. 4A-B, except that the mobile device 114 of the system 134c, attached to the triggering handle 100a via the hinged attachment bracket 146, may be pivoted and maintained at a desired angle (via the hinge 148). For example, the user's view of the display screen (152) of the mobile device 114 may be improved, and a dorsally mounted peripheral 142 (e.g., a 3D/IR imager set into the dorsal face of the mobile device 114) may be aimed at a subject and activated (154), e.g., by actuation of the trigger 106 and/or other buttons (e.g., thumb button 140a, recessed buttons 140b-c; FIG. 4A) of the triggering handle 100a.

Referring to FIGS. 6A through 6C, the system 134d may be implemented and may function similarly to the systems 134a-c of FIGS. 4A-B and 5B, except that the system 134c may include a triggering handle 100b scaled to, attachable to, and wirelessly linkable to, a smartphone 114b or similarly scaled-down mobile device. For example, the triggering handle 100b may include an attachment cradle 156 sized to fit the smartphone 114b, and into which the smartphone may slidably be mounted (158). Once the smartphone 114b is mounted to the attachment cradle 156 and thereby attached to the triggering handle 100b, the triggering handle may establish a wireless link to the smartphone 114b, via which key codes may be transmitted to activate components or peripherals (126) of the smartphone according to articulation of the trigger 106 or buttons (e.g., thumb button 140a, recessed buttons 140b-c; FIG. 4A) of the triggering handle 100b. The triggering handle 100b may include surface contacts (not shown) positioned within the attachment cradle 156, via which the triggering handle 100b may establish a physical data link to the smartphone 114b by connecting to opposing surface contacts 114c (e.g., pogo pins) of the smartphone. The lower portion of the triggering handle 100b may include a battery compartment (104a) for insertion of a battery or portable power source, the battery compartment 104a accessible through the bottom surface 104. In some embodiments, the triggering handle 100b may include one or more induction coils (not shown) for wireless charging of the onboard battery power source.

Referring in particular to FIGS. 6B and 6C, the smartphone 114b may include a scanner, 3D imager, or other similar component or peripheral (126) which may be pointed and "aimed" by pointing the triggering handle 100b, with which the front (102a) of the peripheral 132 is aligned. Actuating the trigger 106 (or, alternatively, the appropriately programmed recessed button 140b-c) may transmit key codes to the smartphone 114b, receipt of which by the smartphone may activate the peripheral 126 and/or related software installed to the smartphone (e.g., scanning encoded information or capturing imagery for processing by a volume dimensioning system).

Figure 7B:
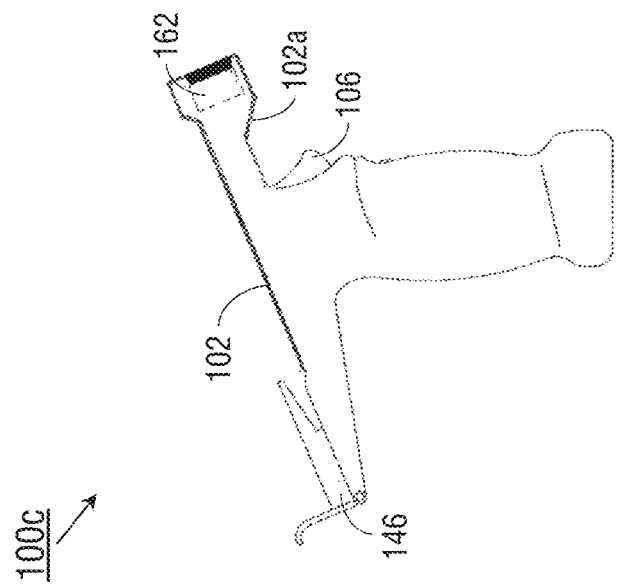
FIGS. 7A and 7B are respectively top- and right-side views of a triggering handle according to the inventive concepts disclosed herein.
Figure 7A:
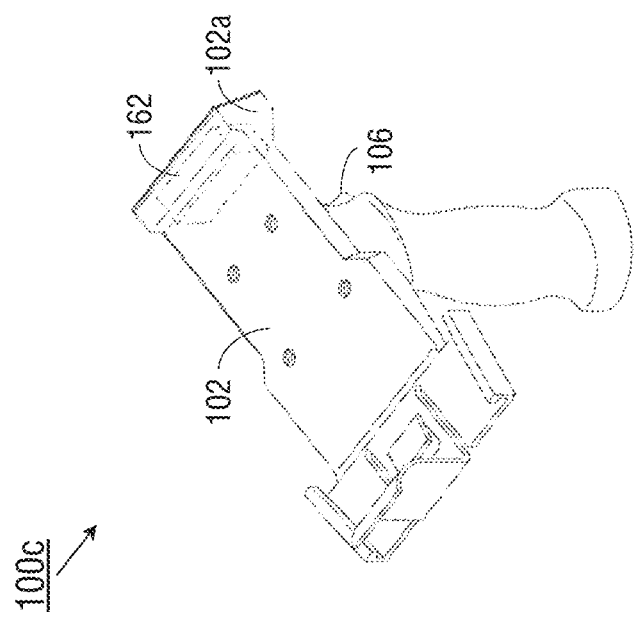

Referring to FIGS. 7A and 7B, the triggering handle 100c may be implemented and may function similarly to the triggering handle 100b of FIGS. 6A-C, except that the triggering handle 100c may include a specialized peripheral (162) embedded into the front (102a) of the top surface 102 of the triggering handle. For example, the specialized peripheral 162 may include an imager, 3D imager, or scanner mounted into the front 102a of the triggering handle 100c. Similarly to the peripheral 126 of FIG. 6B, a user may "aim" the specialized peripheral 162 at a desired subject or target by pointing the triggering handle 100c. Similarly, the user may program the trigger 106 or another button (e.g., thumb button 140a, recessed buttons 140b-c; FIG. 4A) of the triggering handle 100c to activate, via actuation of the trigger or button/s, the specialized peripheral 162 (e.g., capturing images, scanning encoded data, or opening software installed to an attached mobile device (114, FIG. 3; 114a, FIG. 6A-C) and compatible with the specialized peripheral), which may transmit the captured data stream to the attached mobile device 114. The triggering handle 100c may be physically attached, or mounted, to the mobile device 114, and the specialized peripheral 158 may be wirelessly linked thereto. Referring in particular to FIG. 7B, the triggering handle 100c may include a hinged attachment bracket 146.

Figure 8A:
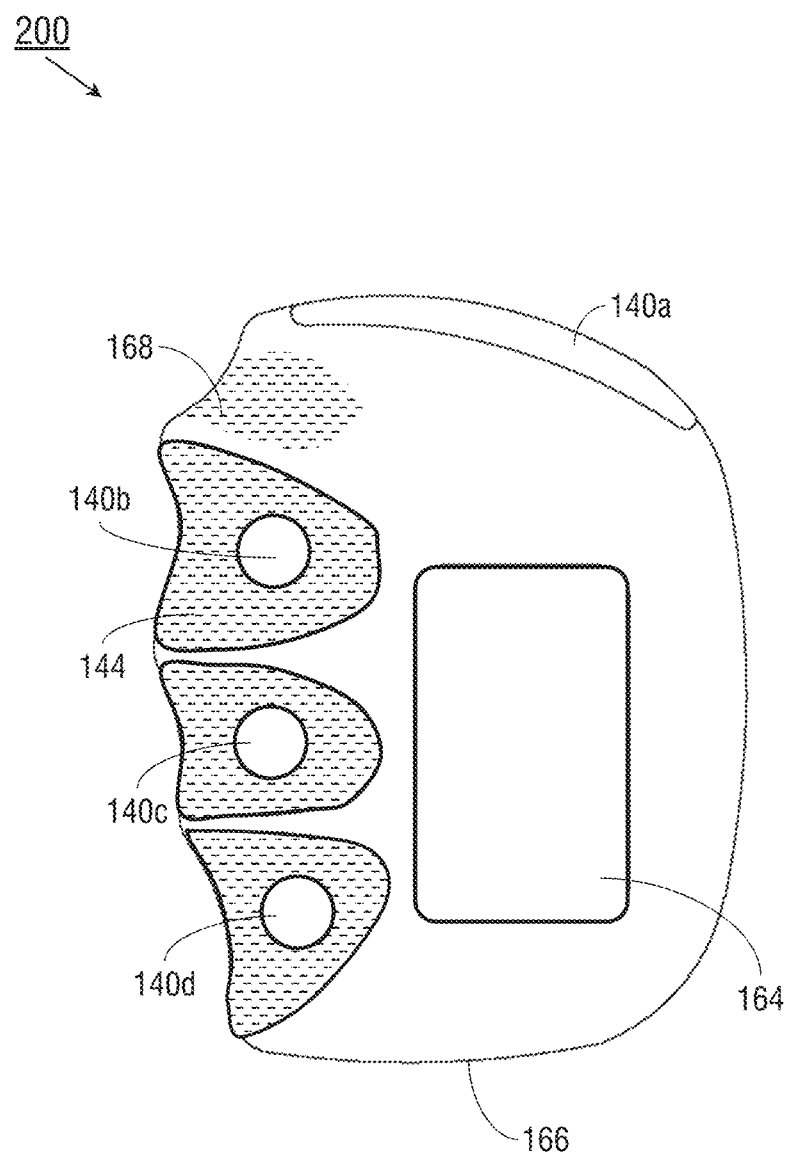
FIG. 8A is an exemplary embodiment of an enumerating device according to the inventive concepts disclosed herein.
Figure 8B:
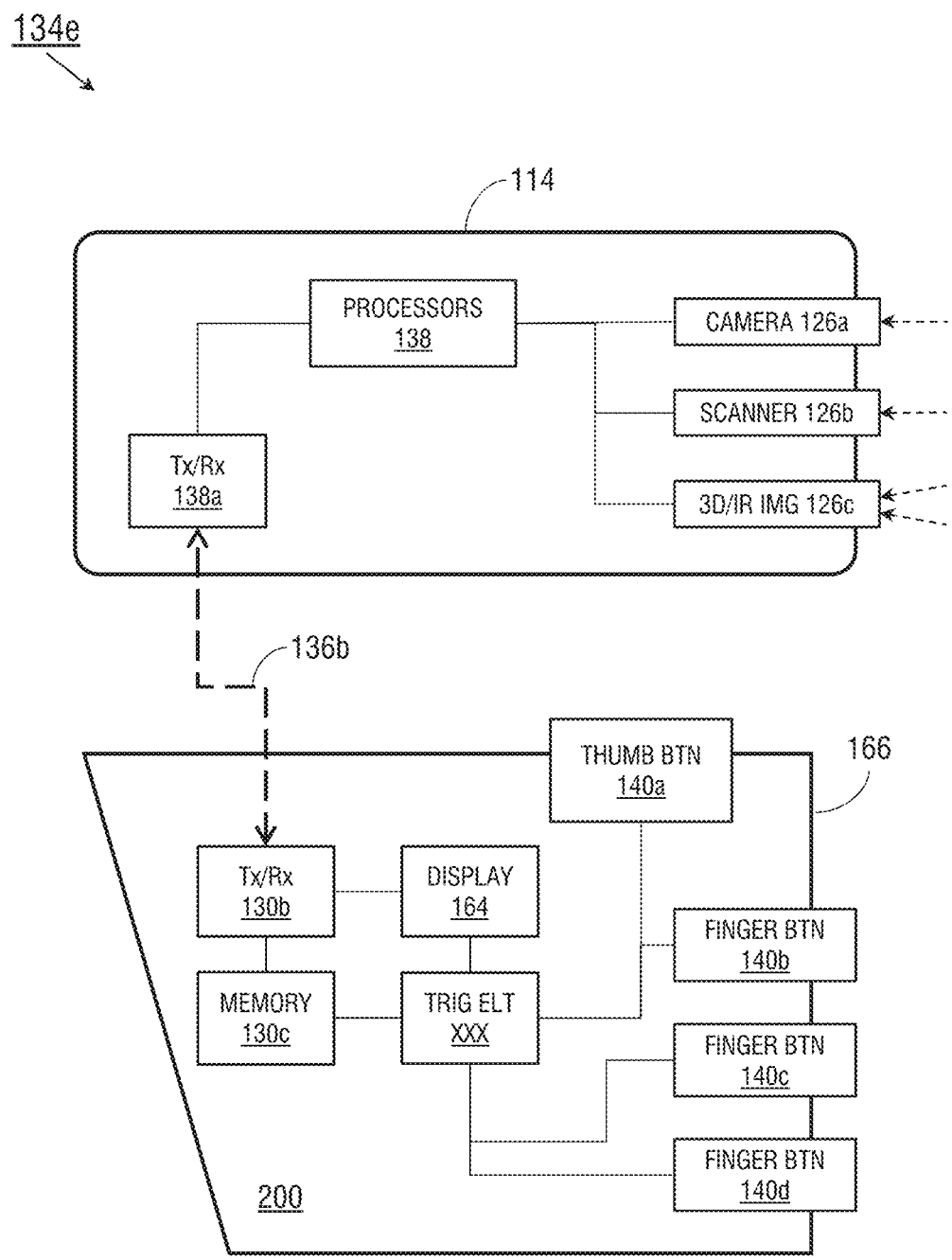
FIG. 8B is a diagrammatic illustration of the enumerating device of FIG. 8A.

Referring to FIGS. 8A and 8B, an exemplary embodiment of an enumerating device 200 according to the inventive concepts disclosed herein is shown. The system 134e as shown by FIG. 8B may be implemented and may function similarly to the system 134 of FIG. 3, except that the enumerating device 200 of the system 134e may be held in the hand of, and operated by, a user whose eyes and/or attention may be directed away from the enumerating device.

The enumerating device 200 may be fashioned of high impact materials similar to the triggering handle 100 (FIG. 1) and variably proportioned in order to optimally accommodate users of either handedness or a broad variety of hand sizes. The enumerating device 200 may include an internal battery or like power supply (not shown) and may link wirelessly to the mobile device 114, e.g., when activated via the thumb button 140a. While the enumerating device 200 may include a display screen (164) for displaying status updates related to operations of the enumerating device, functions associated with each recessed button (140a-d) of the enumerating device, or an active wireless link (136b) between the enumerating device and the mobile device 114, it is contemplated that the enumerating device may be operated without the need for visual reference by the user to the screen 164 or to any other part of the enumerating device. Similarly, the enumerating device 200 may be operated in conjunction with the mobile device 114 without the physical attachment of the enumerating device to the mobile device.

The user, for example, may hold the enumerating device 200 in the right hand, transmitting (130b) key codes and instructions (stored to the onboard memory 130c) to trigger specific corresponding functions (e.g., software applications, camera 126a, scanner 126b, 3D/IR imager 126c) of the mobile device 114 with the thumb and/or fingers of said right hand (e.g., by actuating the thumb button 140a and recessed buttons 140b-d, corresponding to the right index, middle, and little fingers respectively). Each of the thumb and recessed buttons 140a-d may be configured or programmed (e.g., via the linked mobile device 114) to transmit (130b) specific key codes, instructions, or sets and sequences thereof to the mobile device, thereby activating particular software applications and/or peripherals (126a-c) of the mobile device.

Similarly to the recessed buttons 140b-c shown by FIG. 4A, the recessed buttons 140b-d may be recessed (144) into the outer housing (166) of the enumerating device 200 to prevent the user from too easily inadvertently actuating the wrong button. The recesses 144 may support the fingers of the user's hand in a non-actuating position that allows for rapid actuation of the appropriate recessed buttons 140b-d by the appropriate fingers without visual reference. Alternatively, a right-handed user may hold the enumerating device 200 in the right hand, rest the right index finger in a recession (168) of the outer housing 164 and the thumb atop the thumb button 140a, and actuate the recessed buttons 140b-d via simple articulation of the middle, ring, and little fingers respectively (rather than the index, middle, and ring fingers). In this way, the user may use the enumerating device 200 to efficiently execute large sets of repetitive tasks in conjunction with the mobile device 114 without visual reference to the enumerating device, e.g., counting several categories of objects, while the other hand is free to execute other tasks or operate other devices.

The enumerating device 200 may be similarly fashioned to accommodate a left-handed user. Alternatively, the enumerating device 200 may be fashioned for ambidextrous use, including a set of recessed buttons 140b-d and a display screen 162 on either side, and thus contoured and alternatively configurable for use in either hand. A user may initialize the enumerating device 200 (e.g., upon activation of the enumerating device via the thumb button 140a) by selecting right- or left-handedness, whereby the set of recessed buttons 140b-d contoured to the preferred hand remains active and configurable, while the opposing set of recessed buttons (and the opposing display screen 164) are rendered inert for that session.

We claim:

1. A ruggedized handle device for a mobile scanning system, comprising:
   an outer shell at least partially contoured to a hand of a user, the outer shell fashioned of a high impact material and having an upper portion and a lower portion, the outer shell enclosing an inner shell fashioned of the high impact material, the upper portion comprising:
an upper surface configured to support a mobile scanning device;
and
a first attachment component configured to removably secure the mobile scanning device to the handle device by engaging a second attachment component of the mobile scanning device, the first attachment component including at least one hinged attachment bracket configured to pivot the mobile scanning device toward the user;
at least one memory disposed within the outer shell and configured to store one or more encoded instructions associated with the mobile scanning device;
at least one triggering element disposed within the inner shell and coupled to the at least one memory, the triggering element configured to:
establish a wireless link to the mobile scanning device; and
transmit the one or more encoded instructions to the mobile scanning device when the handle device is in an active state;
a trigger corresponding to an index finger of the hand and capable of actuation by the index finger, the trigger including a magnetic element having at least a resting position within the outer shell and an active position proximate to the triggering element, the actuation configured to initiate the active state by moving the magnetic element into the active position;
and
at least one luminous element embedded in the outer shell and coupled to the triggering element, the luminous element configured to indicate the active state.

2. The ruggedized handle device of claim 1, wherein:
the actuation is configured to cause the triggering element to attempt establishing the wireless link;
and
the luminous element is configured to indicate at least one of the attempt and the successful establishment of the wireless link.

3. The ruggedized handle device of claim 1, wherein the lower portion terminates in a lower surface configured to support at least one of the handle device and the mobile scanning device in a stable level state atop a flat surface.

4. The ruggedized handle device of claim 1, wherein the mobile scanning device includes at least one of a tablet, a smartphone, and a portable computing device.

5. The ruggedized handle device of claim 1, wherein the mobile scanning device is configured to:
determine the encoded instructions based on input from the user;
and
store the encoded instructions to the memory.

6. The ruggedized handle device of claim 1, wherein the encoded instructions are associated with at least one of:
software configured for execution by at least one processor of the mobile scanning device;
and
a first peripheral device incorporated into the mobile scanning device and including at least one of a first camera, a first scanner, and a first three-dimensional imager.

7. The ruggedized handle device of claim 6, wherein the encoded instructions are associated with at least one second peripheral device mechanically attached to, but not operatively connected to, the mobile scanning device, the second peripheral device including at least one of a second camera, a second scanner, and a second three-dimensional imager.

8. The ruggedized handle device of claim 1, wherein:
the second attachment component is attached to a dorsal surface of the mobile scanning device;
and
the encoded instructions are associated with at least one second peripheral device disposed within the dorsal surface.

9. The ruggedized handle device of claim 1, further comprising:
one or more buttons configured to initiate the active state and including at least one of a first button corresponding to a non-index finger of the hand and a second button corresponding to a thumb of the hand, each of the one or more buttons embedded within a recess set into the outer shell, the recess surrounding the button and configured to support at least one of the non-index finger and the thumb in a non-actuating position proximate to the button.

10. The ruggedized handle device of claim 9, wherein the one or more encoded instructions comprise:
at least one first encoded instruction associated with the first button;
and
at least one second encoded instruction associated with the second button.

11. The ruggedized handle device of claim 1, wherein the at least one luminous element includes at least one light-emitting diode (LED).

12. The ruggedized handle device of claim 1, wherein the outer shell is rated at least IP65.

13. A handheld enumerating device for a mobile scanning system, comprising:
an outer housing fashioned of a high impact material and configured to be held within, and operated by, a hand of a user;
a triggering element enclosed by the outer housing, the triggering element configured to establish a wireless link to at least one mobile computing device not physically attached to the enumerating device;
a memory coupled to the triggering element, the memory configured to store one or more encoded instructions associated with the mobile computing device;
one or more buttons embedded in the outer shell and configured to cause the triggering element to transmit the one or more encoded instructions to the mobile computing device upon actuation by the user, the one or more buttons including:
a thumb button corresponding to a thumb of the hand; and
a plurality of recessed buttons, each recessed button corresponding to a finger of the hand and disposed within a recess set into the outer housing, the recess configured to support the corresponding finger in a non-actuating position proximate to the recessed button.

14. The handheld enumerating device of claim 13, wherein the one or more encoded instructions include:
one or more first encoded instruction associated with the thumb button;
and
one or more second encoded instructions associated with the at least one recessed button.

15. The handheld enumerating device of claim 13, wherein the one or more encoded instructions are associated with one or more of:

software configured to execute on the mobile computing device;
and
a peripheral device incorporated into the mobile computing device and including at least one of a camera, a counter, a scanner, and a three-dimensional imager.

16. The handheld enumerating device of claim 13, further comprising:
at least one display screen set into the outer housing and coupled to the triggering element, the display screen configured to display at least one of the status of the wireless link and the one or more encoded instructions.

17. The handheld enumerating device of claim 13, wherein the mobile computing device is configured to:
determine the one or more encoded instructions based on input from the user;
and
store the one or more encoded instructions to the memory.

18. The handheld enumerating device of claim 13, wherein the outer housing is contoured to one of a left hand of the user and a right hand of the user.

19. The handheld enumerating device of claim 13, wherein:
the at least one recessed button comprises:
at least one left-hand recessed button corresponding to a left-hand finger of the user;
and
at least one right-hand recessed button corresponding to a right-hand finger of the user;
and
the thumb button is configured to:
select one of the at least one left-hand recessed button and the at least one right-hand recessed button based on a handedness of the user;
activate the at least one selected recessed button;
and
deactivate the at least one non-selected recessed button.

* * * * *